(12) United States Patent
Abbott

(10) Patent No.: US 6,416,209 B1
(45) Date of Patent: Jul. 9, 2002

(54) EXTERIOR COURTESY LIGHTING/FENDER MOUNTED

(75) Inventor: Glenn W Abbott, West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/636,184

(22) Filed: Aug. 10, 2000

(51) Int. Cl.[7] ............................................... B60Q 1/32
(52) U.S. Cl. ...................... 362/506; 362/495; 362/501; 362/508; 362/327; 362/510; 362/520; 362/481; 362/496; 362/522; 362/360
(58) Field of Search ................................. 362/506, 495, 362/496, 501, 481, 360, 359, 508, 510, 520, 522, 327

(56) References Cited

U.S. PATENT DOCUMENTS

| | | | | |
|---|---|---|---|---|
| 3,017,500 A | * | 1/1962 | Pezzopane | 362/506 |
| 3,678,635 A | * | 7/1972 | Vagi et al. | 52/28 |
| 4,802,069 A | * | 1/1989 | Chandler | 362/83 |
| 4,964,022 A | * | 10/1990 | Lane | 362/80 |
| 5,863,116 A | | 1/1999 | Pastrick et al. | |
| 5,893,638 A | * | 4/1999 | Huffner et al. | 362/506 |
| 6,074,077 A | | 6/2000 | Pastrick et al. | |
| 6,086,229 A | | 7/2000 | Pastrick | |
| 6,158,869 A | * | 12/2000 | Barnes | 362/86 |
| 6,220,732 B1 | * | 4/2001 | Paffrath | 362/496 |
| 6,280,069 B1 | * | 8/2001 | Pastrick et al. | 362/494 |
| 6,296,379 B1 | * | 10/2001 | Pastrick | 362/494 |
| 6,332,700 B1 | * | 12/2001 | Baines | 362/486 |

* cited by examiner

Primary Examiner—Sandra O'Shea
Assistant Examiner—Anabel Ton
(74) Attorney, Agent, or Firm—Edwin W. Bacon, Jr.

(57) ABSTRACT

A vehicle puddle light assembly is provided in an opening formed in a body panel of a vehicle. A socket including a housing and at least one contact coupled to the housing is disposed within the opening and coupled to the body panel adjacent the opening. A lamp is coupled to the contact within the housing. A lens is coupled to the socket outboard of the lamp. The lens has an opaque upper portion and a transmissive lower portion having a plurality of facets formed therein for projecting light from the assembly and a predominantly downward and outboard direction. The housing includes a reflective upper portion for directing radiation from the lamp toward the transmissive portion of the lens and a reflective lower portion for directing radiation from the lamp toward a reflective surface of the lens formed inboard of the opaque upper portion. The radiation is then redirected toward the reflective upper portion of the housing and then toward the transmissive portion of the lens. The lamp is illuminated upon the detection of one of a door unlock signal from a remote key fob or a door opening event. The lamp is extinguished upon the detection of a door closing event after the illuminating step.

12 Claims, 2 Drawing Sheets

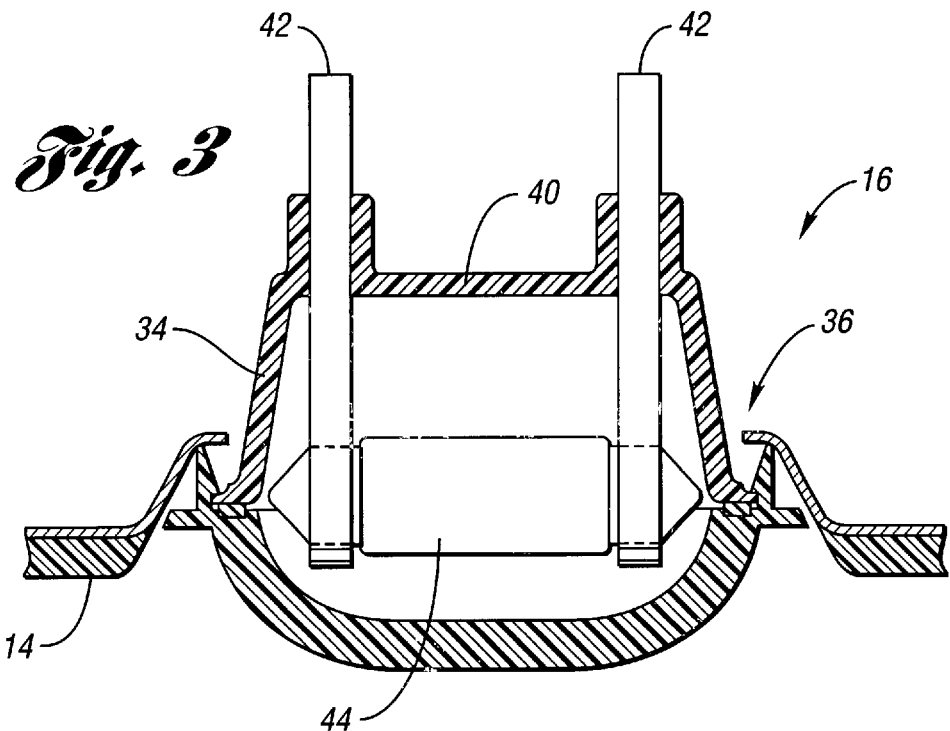
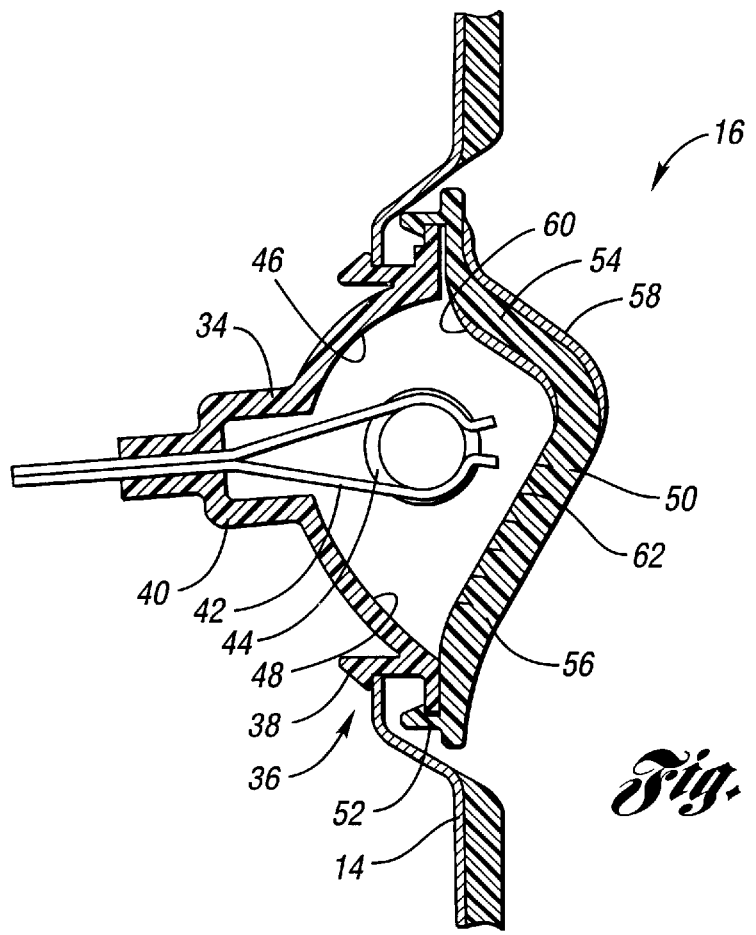

EXTERIOR COURTESY LIGHTING/FENDER MOUNTED

BACKGROUND

1. Technical Field

The present invention generally relates to external lamps for motor vehicles and, more particularly, to an approach light mounted on a body panel of the motor vehicle.

2. Discussion

In certain circumstances, it may be desirable to illuminate the area adjacent a motor vehicle as the vehicle operator approaches the vehicle. One such device for illuminating an area adjacent a vehicle is known in the art as a puddle lamp. Conventional puddle lamps are mounted on the side rearview mirrors of the vehicle so as to project light on an area adjacent the vehicle.

Unfortunately, such conventional puddle lights suffer from the complexity of incorporating a light into the relatively tight configuration of an external side mirror. Further, the intensity of the radiation of such conventional puddle lights is compromised due to the distance the radiation must travel before impinging upon the ground. Another drawback of such conventional puddle lights is their relatively obvious appearance on the vehicle. In other words, such conventional puddle lights do not complement the ornamental features of the vehicle body styling.

In view of the foregoing, it would be desirable to provide an improved puddle lamp for illuminating an area adjacent a vehicle.

SUMMARY OF THE INVENTION

The above and other objects are provided by a vehicle puddle light assembly including a vehicle body panel having an opening formed therein. A socket including a housing and at least one contact coupled to the housing is disposed within the opening and coupled to the body panel adjacent the opening. A lamp is coupled to the contact within the housing. A lens is coupled to the socket outboard of the lamp. The lens has an opaque upper portion and a transmissive lower portion having a plurality of facets formed therein for projecting light from the assembly in a predominantly downward and outboard direction. The interior of the housing includes a reflective upper portion for directing radiation from the lamp toward the transmissive portion of the lens and a reflective lower portion for directing radiation from the lamp toward a reflective surface of the lens formed inboard of the opaque upper portion. Radiation striking the reflective surface of the lens is redirected toward the reflective upper portion of the housing and then toward the transmissive portion of the lens.

In accordance with another aspect of the present invention, a method is provided for illuminating an area adjacent the vehicle. The method includes providing a lamp assembly in a body panel of the vehicle. The lamp is illuminated upon the detection of one of a door unlock signal from a remote key fob or a door opening event. The lamp is extinguished upon the detection of a door closing event after the illuminating step.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 3 is a horizontal cross sectional view of the puddle lamp assembly of the present invention; and FIG. 4 is a vertical cross-sectional view of the puddle lamp assembly of the present invention.

DETAILED DESCRIPTION OF THE PREFERRED EMBODIMENTS

The present invention is directed toward a puddle lamp assembly for a motor vehicle. The puddle lamp assembly includes a lamp assembly incorporated in a body panel of the motor vehicle. Advantageously, the configuration of the puddle lamp assembly of the present invention allows for improved illumination of an area adjacent the vehicle and for complementing the ornamental styling of the vehicle body.

Figure 1:
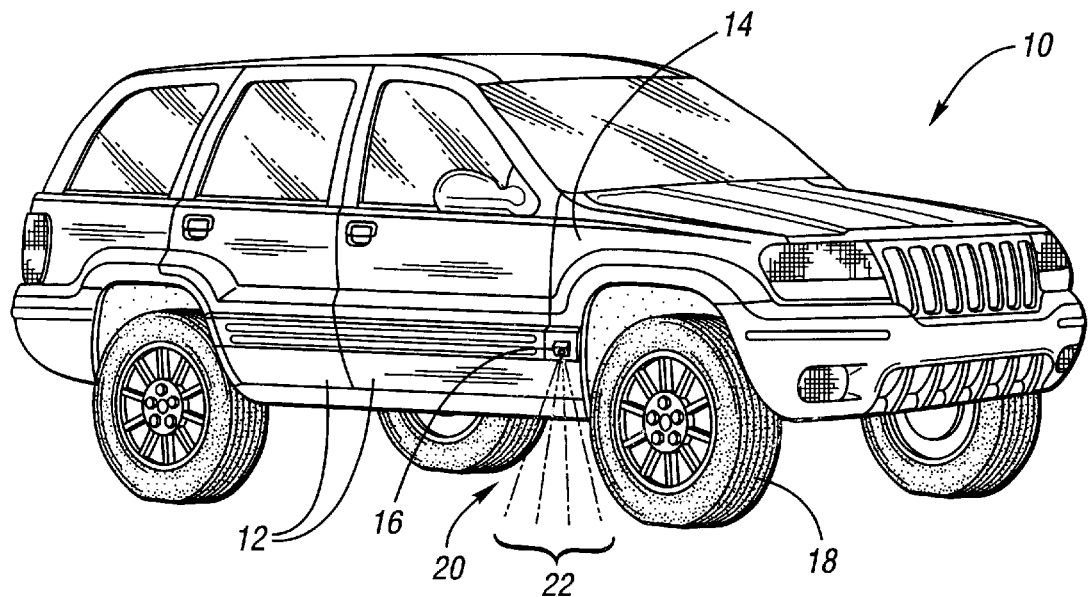
FIG. 1 is a side view of a motor vehicle including the puddle light of the present invention.

Turning now to the drawing figures, FIG. 1 illustrates a vehicle 10 incorporating the teachings of the present invention. Vehicle 10 includes a plurality of body panels such as a pair of doors 12 and a front quarter panel 14. Although only one-half of vehicle 10 is visible in FIG. 1, one skilled in the art will appreciate that the opposite side of vehicle 10 is substantially similar to that illustrated.

One of the body panels, in this case, the front quarter panel 14, includes a lamp assembly 16 mounted therein. The lamp assembly 16 is mounted rearward of the front wheel well 18 and in front of the passenger door 12. The lamp assembly 16 projects radiation, generally indicated at 20, in a direction generally downward and outboard of vehicle 10. As such, an area 22 adjacent vehicle 10 is illuminated.

Figure 2:
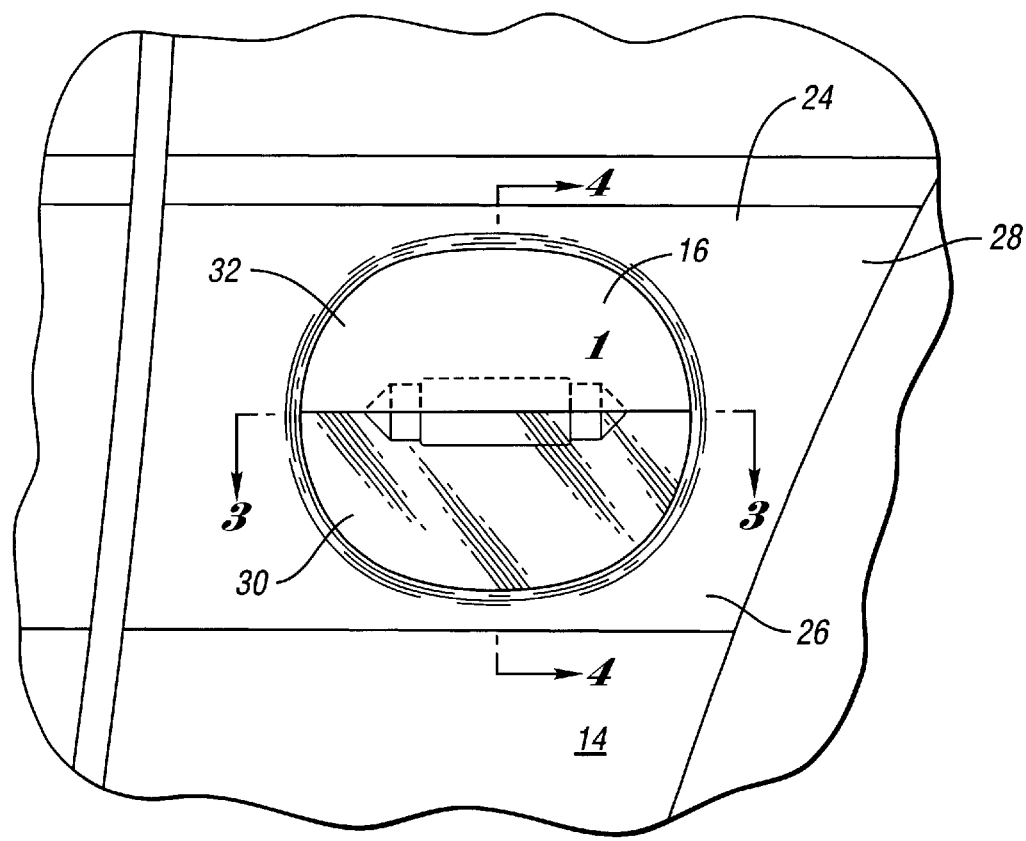
FIG. 2 is a more detailed side view of the puddle lamb assembly of the present invention.

Turning now to FIG. 2, light assembly 16 is preferably incorporated into panel 14 so as to aligned with a molding strip 24. Molding strip 24 has a contour which includes a first portion 26 sloping vertically upwardly and outwardly relative to panel 14 and a second portion 28 sloping vertically upwardly and inwardly relative to panel 14 . Likewise, lamp assembly 16 includes a first portion 30 sloping vertically upwardly and outwardly relative to panel 14 and a second portion 32 sloping vertically upwardly and inwardly relative to panel 14. As such, the shape of the lens assembly 16 complements the shape of molding strip 26 such that a smooth body styling is provided.

Referring now to FIGS. 3 and 4, the lamp assembly 16 is illustrated in greater detail. Lamp assembly 16 includes a socket 34 mounted within an opening 36 formed within the body panel 14. Preferably, socket 34 is coupled to body panel 14 by at least one latch 38. Alternatively, conventional fasteners such as bolts may substitute for the latch 38.

Socket 34 includes a housing 40 and a pair of contacts 42. A lamp in the form of a bulb 44 is coupled to contacts 42 which provide electrical current to bulb 44. Bulb 44 preferably aligns substantially along the plane of the panel 14. Preferably, bulb 44 is a ten watt cartridge bulb although other illumination sources such as halogen lamps, LEDs, and optical fibers may substitute therefore.

An interior of housing 40 includes an upper reflective surface 46 and a lower reflective surface 48. Surfaces 46 and 48 may be inherent to housing 40 by forming housing 40 of a highly reflective metallic type material or may be provided by coating housing 40 with a highly reflective material. The angling of the surfaces 46 and 48 is preselected to direct radiation from bulb 44 in a predetermined manner as described below.

Lens assembly 16 also includes a lens 50 coupled to socket 34. Preferably tabs 52 are employed for this purpose. Lens 50 includes an upper opaque portion 54 and a lower transmissive portion 56. Upper opaque portion 54 may be made inherently opaque by proper selection of the material of lens 50 but preferably is made opaque by painting portion 54 with a paint 58 matching and/or complementing a color of panel 14 or of molding 24.

Lens 50 includes an interior reflective portion 60 inboard of opaque upper portion of 54 for redirecting radiation from lamp 44. The angle of reflective portion 60 is selected to direct the radiation in a predetermined manner as described below.

Lens 50 also includes a plurality of facets 62 formed in the transmissive portion 56. Facets 62 direct radiation from lamp 44 predominantly downwardly and outwardly relative to the assembly 16. As one skilled in the art will appreciate, the number and angle of the facets 62 may be selected to control the angle and divergence of the radiation emitted from the assembly 16.

In operation, radiation from lamp 44 is projected radially outwardly towards the interior of housing 40 and lens 50. Radiation impinging upon lower reflective surface 48 of housing 40 is redirected towards reflective surface 60 of lens 50. This radiation and any other radiation from lamp 44 impinging upon reflective surface 60 is redirected towards upper reflective surface 46 of housing 40. This reflected radiation and any other radiation impinging upon reflective surface 46 is redirected toward transmnissive portion 56 of lens 50. This radiation and all other radiation projecting towards tranmissive portion 56 is directed by facets 62 downwardly and outwardly relative to assembly 16.

Preferably, lamp 44 illuminates upon the detection of the opening of either door 12 or a door unlock signal from a remote key fob. Lamp 44 extinguishes upon the detection of a closing of the doors 12. Of course, other activation/deactivation sequences may substitute therefore.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A vehicle puddle light assembly comprising:
   a vehicle body;
   a panel of said body having an opening formed therein;
   a socket disposed within said opening and coupled to said body panel adjacent said opening;
   a lamp coupled within said socket; and
   a lens coupled to said socket and outboard of said lamp, said lens having an opaque upper portion and a transmissive lower portion, said opaque upper portion being reflective on an inboard surface thereof; and
   said lens being adapted to project light from said lamp in a predominantly downward and outboard direction.

2. The assembly of claim 1 wherein said lamp is substantially aligned with an outboard edge of said body panel.

3. The assembly of claim 1 wherein said lens is shaped to complement an ornamental molding feature of said body panel.

4. The assembly of claim 1 wherein said socket further comprises a housing and at least one contact coupled to said housing for supporting said lamp therein.

5. The assembly of claim 1, said transmissive lower portion having a plurality of facets formed therein.

6. A vehicle puddle light assembly comprising:
   a vehicle body;
   a panel of said body having an opening formed therein;
   a socket disposed within said opening and coupled to said body panel adjacent said opening, said socket further comprising a housing including an upper reflective portion and a lower reflective portion;
   a lamp coupled within said socket; and
   a lens coupled to said socket outboard of said lamp, said lens projecting light from said lamp in a predominantly downward and outboard direction.

7. The assembly of claim 6 wherein said lower reflective portion is configured to reflect radiation from said lamp toward an internally reflecting portion of said lens.

8. The assembly of claim 7 wherein said upper reflective portion is configured to reflect radiation from said lamp to a transmissive portion of said lens.

9. The assembly of claim 6 wherein said body panel is a front quarter panel.

10. The assembly of claim 9 wherein said opening is located rearward of a wheel well formed in said front quarter panel.

11. The assembly of claim 6 wherein said lamp is illuminated upon detecting at least one of a door unlock command of a remote key fob and a door opening event.

12. The assembly of claim 11 wherein said lamp is extinguished upon a door closing event.

* * * * *